(12) United States Patent
Clendenen

(10) Patent No.: US 8,324,769 B2
(45) Date of Patent: Dec. 4, 2012

(54) MOTOR CONTROLLER FOR AN ELECTRIC MOTOR

(75) Inventor: David A. Clendenen, Fort Wayne, IN (US)

(73) Assignee: RBC Manufacturing Corporation, Beloit, WI (US)

( * ) Notice: Subject to any disclaimer, the term of this patent is extended or adjusted under 35 U.S.C. 154(b) by 583 days.

(21) Appl. No.: 12/565,542

(22) Filed: Sep. 23, 2009

(65) Prior Publication Data

US 2011/0068661 A1  Mar. 24, 2011

(51) Int. Cl.
*H02K 11/02* (2006.01)
*H02K 11/00* (2006.01)

(52) U.S. Cl. ....... 310/68 D; 310/68 R; 310/71; 361/704; 361/803

(58) Field of Classification Search ................ 310/68 D, 310/68 R, 71; *H02K 11/00, 11/02, 11/04*
See application file for complete search history.

(56) References Cited

U.S. PATENT DOCUMENTS

| | | | |
|---|---|---|---|
| 4,557,225 A * | 12/1985 | Sagues et al. ............... 123/41.31 |
| 4,668,898 A * | 5/1987 | Harms et al. ................ 310/68 D |
| 4,712,030 A * | 12/1987 | Lakin et al. ..................... 310/64 |
| 5,006,744 A | 4/1991 | Archer et al. |
| 5,930,112 A | 7/1999 | Babinski et al. |
| 5,952,798 A | 9/1999 | Jones et al. |
| 6,129,528 A | 10/2000 | Bradbury et al. |
| 6,177,740 B1 | 1/2001 | Burns |
| 6,271,638 B1 | 8/2001 | Erdman et al. |
| 6,525,439 B2 | 2/2003 | Whelan et al. |
| 6,949,849 B1 * | 9/2005 | Wright et al. ............... 310/68 R |

* cited by examiner

*Primary Examiner* — Quyen Leung
*Assistant Examiner* — Michael Andrews
(74) *Attorney, Agent, or Firm* — Armstrong Teasdale LLP

(57) ABSTRACT

A motor controller includes a first circuit board having a top side, a bottom side, and a first edge. The first circuit board includes a power module extending from the top side of the first circuit board. The motor controller also includes a second circuit board having a top side, a bottom side, and a first edge. The second circuit board includes a plurality of electrical components extending from the top side of the second circuit board. The second circuit board is electrically coupled to the first circuit board by at least one conductor. The first circuit board is physically coupled to the second circuit board such that the bottom side of the second circuit board is adjacent the bottom side of the first circuit board.

11 Claims, 8 Drawing Sheets

MOTOR CONTROLLER FOR AN ELECTRIC MOTOR

BACKGROUND OF THE INVENTION

The subject matter described herein relates generally to electric motors, and more specifically to the assembly of an electric motor controller configured to be positioned at least partially within an electric motor housing.

Typically, a motor controller includes a power module that is the single largest component within the motor controller. The power module may require a heat sink to prevent overheating. Typically, components of the motor controller are coupled to a single elongated circuit board having controller components coupled to a first side of the circuit board and the power module coupled to a second side of the circuit board. Coupling the power module to the second side of the circuit board facilitates attaching a heat sink to the power module without interference from the other controller components. This circuit board configuration restrains circuit board size reduction, which limits a manufacturer's ability to reduce a size of an electric motor that includes the motor controller, as well as the ability to reduce a size of systems or apparatuses that include the electric motor.

Furthermore, a typical circuit board manufacturing process utilizes machinery capable of soldering electrical components to one side of the circuit board. In order to couple components to both sides of the circuit board, typically the components on the second side of the circuit board are hand soldered. Hand soldering components on one side of the circuit board limits production efficiency and is labor intensive.

BRIEF SUMMARY OF THE INVENTION

In one aspect, a motor controller is provided. The motor controller includes a first circuit board having a top side, a bottom side, and a first edge. The first circuit board includes a power module extending from the top side of the first circuit board. The motor controller also includes a second circuit board having top side, a bottom side, and a first edge. The second circuit board includes a plurality of electrical components extending from the top side of the second circuit board. The first circuit board is electrically coupled to the second circuit board by at least one conductor. The first circuit board is physically coupled to the second circuit board such that the bottom side of the first circuit board is adjacent the bottom side of the second circuit board.

In another aspect, a method for assembling a motor controller is provided. The motor controller is configured to be positioned at least partially within an electric motor. The motor controller includes a first circuit board and a second circuit board, the first circuit board and the second circuit board each have a top side, a bottom side, and a first edge. The method includes electrically coupling a power module to the top side of the first circuit board, electrically coupling a plurality of electrical components to the top side of the second circuit board, and physically coupling together the first circuit board and the second circuit board such that the bottom side of the first circuit board is adjacent the bottom side of the second circuit board and the first edge of the first circuit board is adjacent the first edge of the second circuit board. The method also includes electrically coupling the first circuit board to the second circuit board using at least one conductor.

In yet another aspect, an electric motor and motor controller assembly is provided. The assembly includes a motor housing, a stationary assembly positioned at least partially within the motor housing, and a rotatable assembly coupled to a shaft and configured to rotate with respect to the stationary assembly. The motor and motor controller assembly also includes a motor controller enclosed at least partially within the motor housing and configured to provide power to at least one of the stationary assembly and the rotatable assembly. The motor controller includes a first circuit board having a top side, a bottom side, and a first edge. The first circuit board includes a power module extending from the top side of the first circuit board. The motor controller also includes a second circuit board having a top side, a bottom side, and a first edge. The second circuit board includes a plurality of electrical components extending from the top side of the second circuit board. The second circuit board is electrically coupled to the first circuit board by at least one conductor. The second circuit board is physically coupled to the first circuit board such that the bottom side of the second circuit board is adjacent the bottom side of the first circuit board.

BRIEF DESCRIPTION OF THE DRAWINGS

FIG. 1 is an exploded view of an exemplary integrated induction motor and motor controller assembly.

FIG. 2 is a fully assembled view of the integrated induction motor and motor controller assembly shown in FIG. 1.

FIG. 3 is a perspective view of an exemplary integrated motor and motor controller assembly.

FIG. 4 is a circuit board layout view of an exemplary motor controller that may be included within the motor and motor controller assembly shown in FIG. 3.

FIG. 5 is a cross-sectional side view of the motor controller shown in FIG. 4.

FIG. 6 is a first perspective view of the motor controller shown in FIG. 4.

FIG. 7 is a second perspective view of the motor controller shown in FIG. 4.

FIG. 8 is a flowchart of an exemplary method for assembling the motor controller shown in FIGS. 4-7.

DETAILED DESCRIPTION OF THE INVENTION

The method and apparatus described herein facilitate manufacturing a compact motor controller. Furthermore, the method and apparatus described herein facilitate economical manufacturing of the motor controller.

Figure 1:
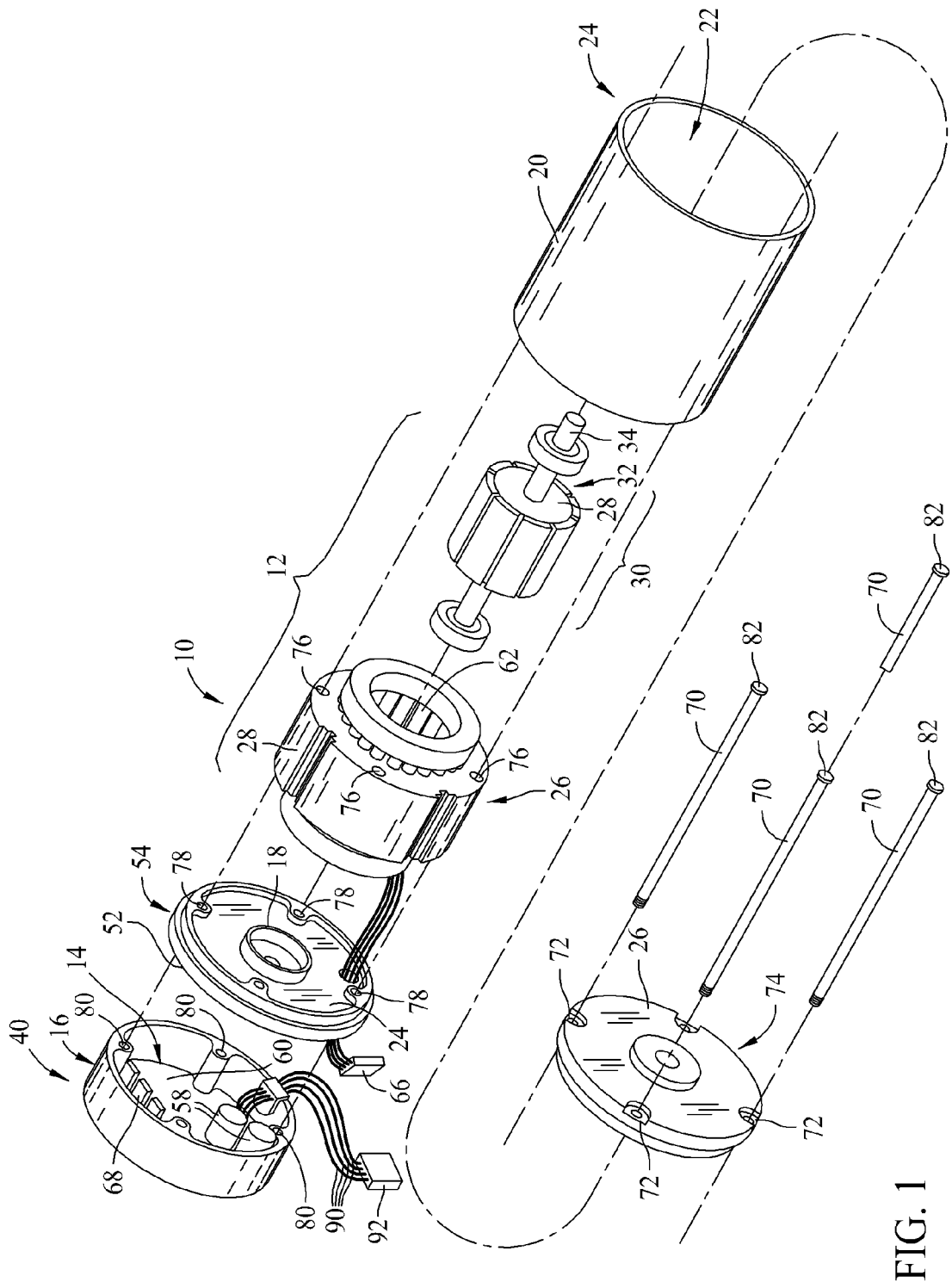
FIGS. 1-8 show exemplary embodiments of the motor controller and method of assembly described herein.
Figure 2:
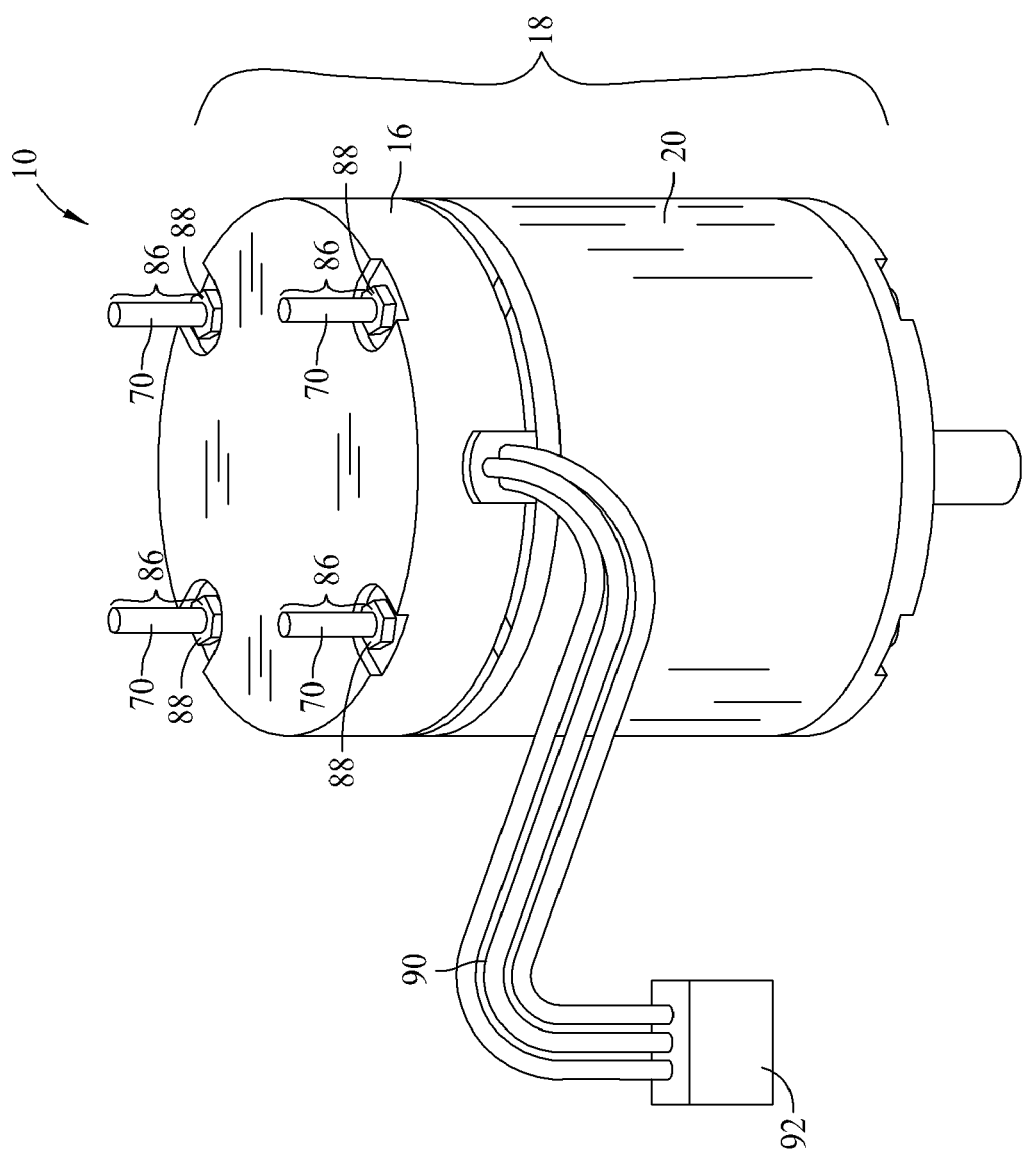

FIG. 1 is an exploded view of an integrated induction motor and motor controller assembly 10, also referred to herein as motor assembly 10. FIG. 2 illustrates the fully assembled motor assembly 10. Motor assembly 10 includes an induction motor 12 and a motor control unit 14, also referred to herein as motor controller 14. Motor controller 14 is configured to be positioned at least partially within an end cap 16. A motor assembly housing 18 includes end cap 16 and a housing shell 20. Motor assembly housing 18 defines an interior 22 and an exterior 24 of motor assembly 10 and is configured to at least partially enclose and protect motor assembly 10. Motor 12 includes a stationary assembly 26 including a stator or core 28 and a rotatable assembly 30 including a permanent magnet rotor 32 and a shaft 34. A fan (not shown) or other device to be driven such as means for moving air through an air handling system engages shaft 34. In the exemplary embodiment, motor assembly 10 is included within an air handling system. For example, motor assembly 10 may be coupled to a fan for blowing air over cooling coils and/or coupled to an air conditioning compressor for driving the compressor.

End cap 16 is mounted on a rear portion 40 of motor assembly 10 to enclose motor controller 14 at least partially within end cap 16. Motor controller 14 is positioned adjacent an outer side 52 of a first end member 54. Motor controller 14 includes a plurality of electronic components 58 and a connector (not shown) mounted on a component board 60, for example, a printed circuit board. Motor controller 14 is connected to winding stages 62 of stationary assembly 26 by interconnecting a winding end turn connector 66 and a motor control unit connector 68. Motor controller 14 applies a voltage to one or more of winding stages 62 at a time for commutating winding stages 62 in a preselected sequence to rotate rotatable assembly 30 about an axis of rotation.

Connecting elements 70, for example, a plurality of bolts, pass through bolt openings 72 in a second end member 74, bolt openings 76 in core 28, bolt openings 78 in first end member 54, and bolt openings 80 in end cap 16. Heads 82 of connecting elements 70 engage the second end member 74. Connecting elements 70 are adapted to urge second end member 74 and end cap 16 toward each other, thereby supporting first end member 54, stationary assembly 26, and rotatable assembly 30 therebetween. Additionally, housing shell 20 may be positioned between first end member 54 and second end member 74 for enclosing and protecting stationary assembly 26 and rotatable assembly 30.

Although described as including induction motor 12, integrated induction motor and motor control unit assembly 10 may include any suitable type of electric motor including, but not limited to, induction motor 12, a brushless direct current (BLDC) motor, an electronically commutated motor (ECM), a brushless alternating current (BLAC) motor, or a stepper motor.

As described above, FIG. 2 illustrates motor assembly 10 in a fully assembled state. Connecting elements 70 pass through second end member 74, stationary assembly 26, first end member 54, and end cap 16. Connecting elements 70 have a portion 86 which projects laterally from end cap 16. Portion 86 is adapted to engage a support structure (not shown) for supporting the motor assembly 10. Connecting elements 70 may be secured in place by placing a nut 88 engaging the threads on each of portions 86 of connecting elements 70. A wiring harness 90 and a connector 92 are utilized to connect motor assembly 10 to an electrical power source.

Figure 3:
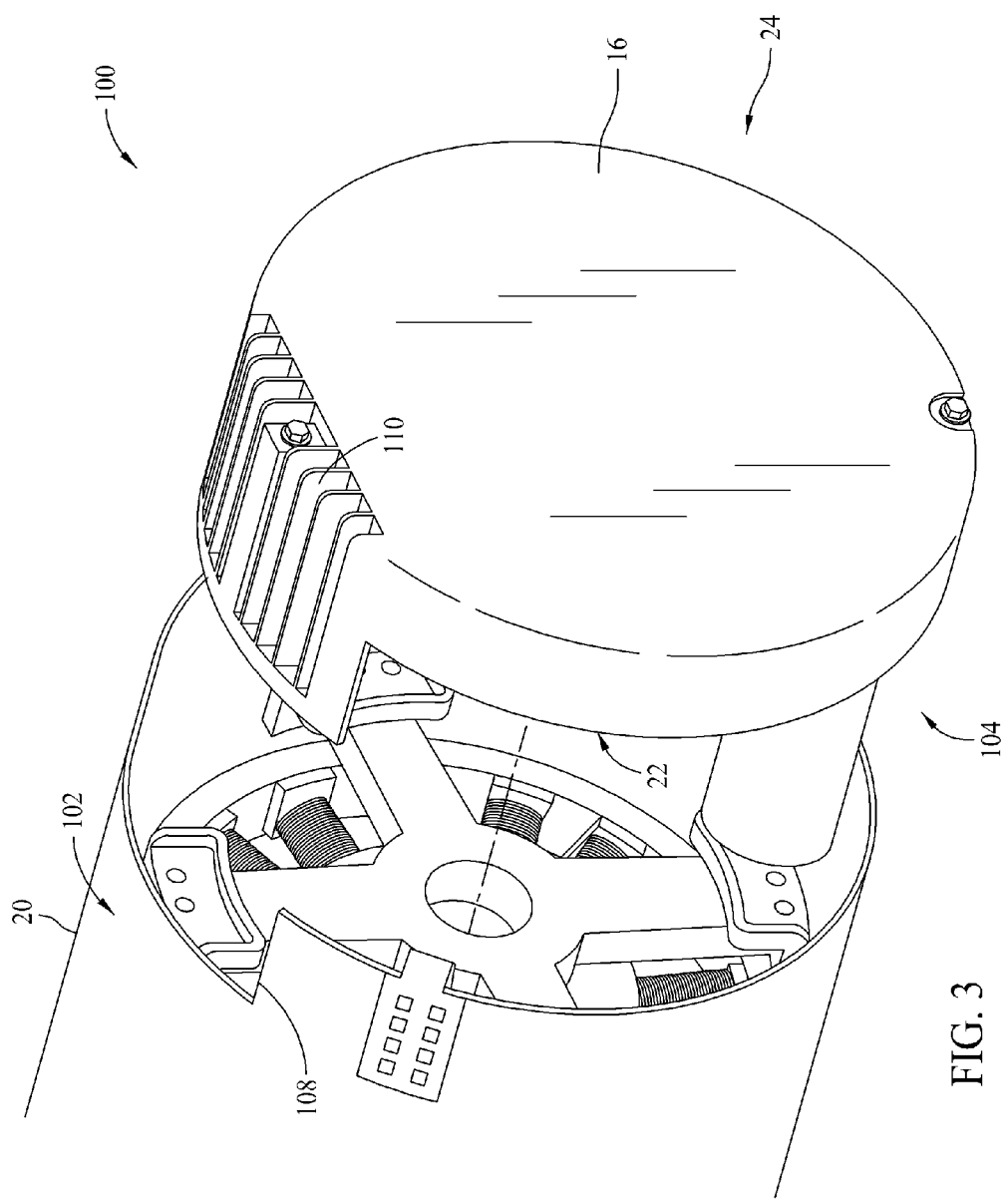

FIG. 3 is a perspective view of an exemplary integrated motor and motor control unit assembly 100. Components shared between motor assembly 100 and motor assembly 10 (shown in FIG. 1) are identified with the same reference numbers. Motor assembly 100 includes an ECM 102 and an ECM motor controller 104 positioned at least partially within end cap 16. In the exemplary embodiment, motor controller 104 is coupled to a surface (not shown) of end cap 16, in interior 22 of end cap 16. In the exemplary embodiment, housing shell 20 also includes a slot 108 which engages a heat sink 110 formed in end cap 16.

Figure 4:
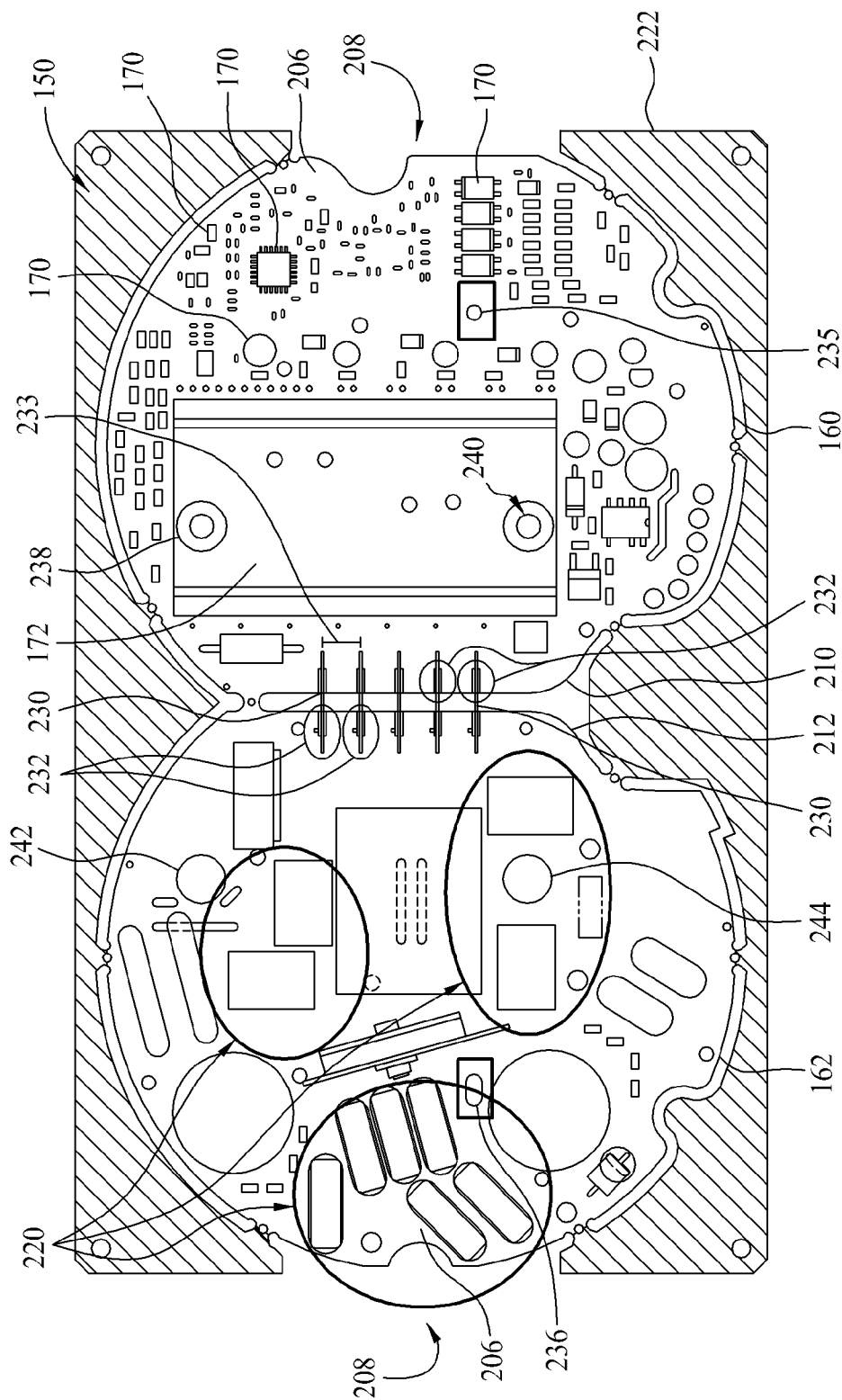

FIG. 4 is a circuit board view of an exemplary motor controller 150 that may be included within motor assembly 10 (shown in FIG. 1) and/or within motor assembly 100 (shown in FIG. 3). Motor controller 150 may be an ECM motor controller, for example, motor controller 104 (shown in FIG. 3), an induction motor controller, for example, motor controller 14 (shown in FIG. 1), or a motor controller configured to control any other type of electric motor. In the exemplary embodiment, motor controller 150 includes a first circuit board 160 and a second circuit board 162. A first plurality of electrical components 170 are coupled to first circuit board 160. For example, electrical components 170 may include through-hole electrical components and/or surface-mount electrical components. In the exemplary embodiment, first plurality of components 170 includes a power module 172, such as a dual in-line package power module, however, any suitable power module may be coupled to first circuit board 160 that allows motor controller 150 to function as described herein. In an exemplary embodiment, first circuit board 160 and second circuit board 162 are printed circuit boards that include leads and/or traces (not shown in FIG. 4) that electrically couple electrical components to form a circuit. First circuit board 160 includes a top side 206, a bottom side 208, and a center edge 210. More specifically, in the exemplary embodiment, electrical components 170 are coupled to, and extend from, top side 206 of first circuit board 160.

Similarly, second circuit board 162 includes top side 206, bottom side 208, and a center edge 212. Second circuit board 162 includes a second plurality of electrical components 220 electrically coupled by leads and/or traces (not shown in FIG. 4) included within second circuit board 162. For example, electrical components 220 may include through-hole electrical components and/or surface-mount electrical components. In the exemplary embodiment, first circuit board 160 and second circuit board 162 are assembled from a single printed circuit board 222, which is divided to form first circuit board 160 and second circuit board 162 after components 170 are coupled to first circuit board 160 and components 220 are coupled to second circuit board 162. In an alternative embodiment, first circuit board 160 and second circuit board 162 are separate printed circuit boards while components 170 and 220 are attached thereto. Since first plurality of components 170 are coupled to top side 206 of first circuit board 160 and second plurality of components 220 are coupled to top side 206 of second circuit board 162, no components extend from bottom side 208 of first circuit board 160 or from bottom side 208 of second circuit board 162.

In the exemplary embodiment, first circuit board 160 and second circuit board 162 are electrically coupled using at least one conductor 230. In the exemplary embodiment, the at least one conductor 230 may include, but is not limited to, at least one conductive jumper wire and/or at least one conductive pin header. Electrical signals are transmitted between first circuit board 160 and second circuit board 162 through the at least one conductor 230. In some embodiments, multiple jumper wires electrically couple leads included along center edge 210 of first circuit board 160 and leads included along center edge 212 of second circuit board 162. The jumper wires may be composed of any conductive material that allows motor controller 150 to function as described herein.

In the exemplary embodiment, at least one slot, for example, slots 232, are included within first circuit board 160 along center edge 210 and within second circuit board 162 along center edge 212. Slots 232 facilitate proper initial alignment of conductors 230 and also facilitate maintaining a position of conductors 230 during and after assembly of motor controller 150. For example, to satisfy certain predefined safety standards, for example, standards defined by Underwriters Laboratories of Camas, Wash., conductors 230 are spaced apart by a minimum distance 233. Distance 233 is at least partially dependent upon a voltage level across jumper wires 230. Furthermore, slots 232 also facilitate maintaining a predetermined distance between jumper wires 230 and end cap 16, which aids assembly of motor assembly 10. In the exemplary embodiment, circuit boards 160 and 162 also include at least one circuit board connector, for example, but not limited to a snap-in post 234 (shown in FIG. 5) and a first corresponding opening 235 and a second corresponding opening 236. Openings 235 and 236 are aligned respectively on circuit boards 160 and 162 such that snap-in post 234 securely couples first circuit board 160 to second circuit board 162.

In the exemplary embodiment, motor controller 150 includes at least one heat sink connector. In the exemplary embodiment, the at least one heat sink connector includes clearance openings 238 and 240 within first circuit board 160 and clearance openings 242 and 244 within second circuit board 162. Clearance openings 238 and 242 align once first circuit board 160 and second circuit board 162 are coupled together. Similarly, clearance openings 240 and 244 align once first circuit board 160 and second circuit board 162 are coupled together. Clearance openings 238, 240, 242, and 244 form two openings through motor controller 150 that each allow a connection device, for example, a screw (not shown in FIG. 4) to couple together motor controller 150 and end cap 16.

Figure 5:
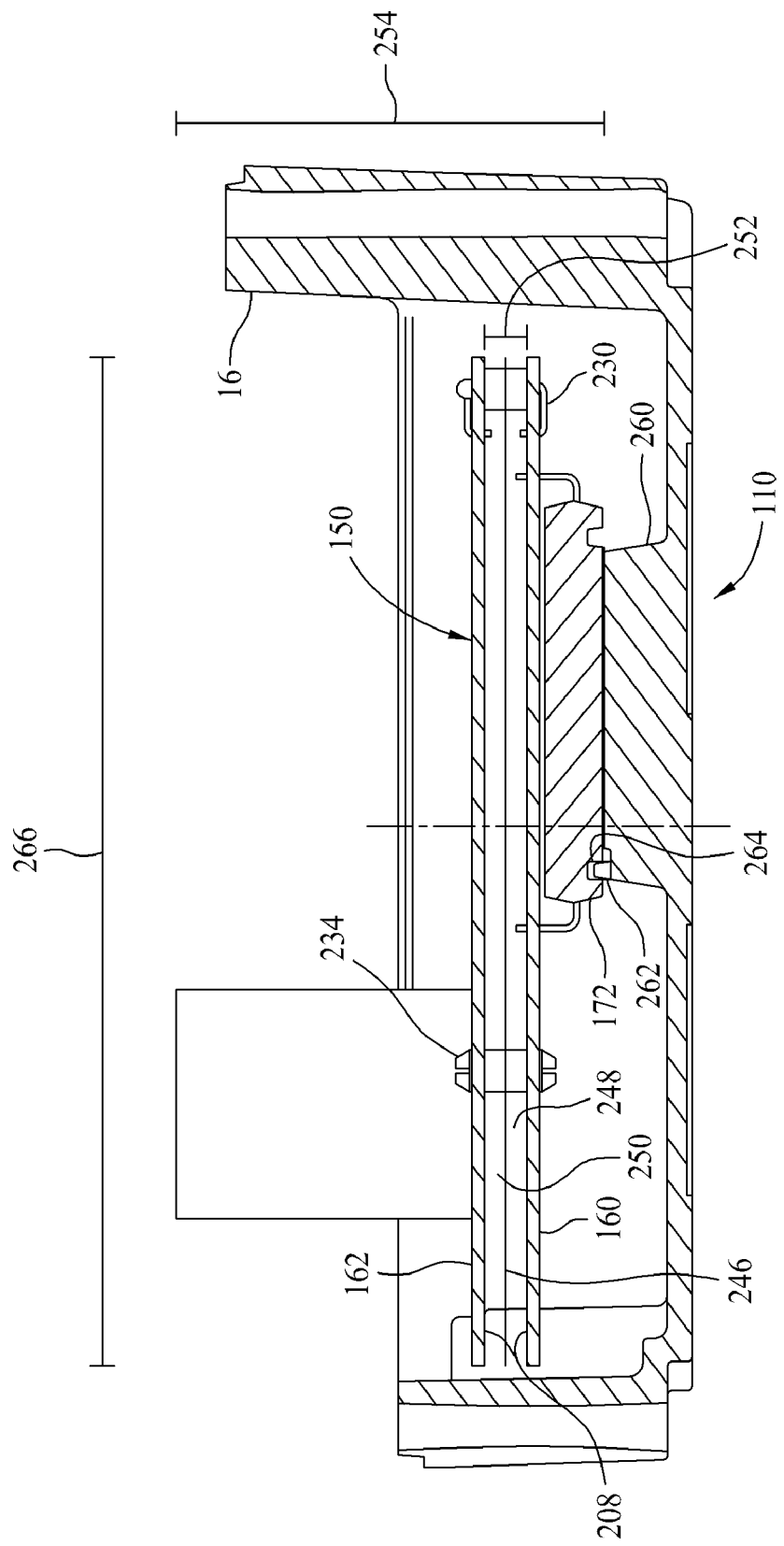

FIG. 5 is a cross-sectional side view of motor controller 150 positioned at least partially within an end cap, for example, end cap 16 (shown in FIG. 3). In the exemplary embodiment, first circuit board 160 and second circuit board 162 are positioned such that bottom side 208 of first circuit board 160 is adjacent bottom side 208 of second circuit board 162. Conductors 230 electrically couple first circuit board 160 and second circuit board 162. In the exemplary embodiment, a dielectric material 246 is included between bottom side 208 of first circuit board 160 and bottom side 208 of second circuit board 162. Dielectric material 246 may include a ceramic, a polymer, a cellulosic, and/or a sheet of boPET (biaxially-oriented polyethylene terephthalate) polyester film, commercially available under the Mylar trademark of DuPont Teijin Films, or any other suitable dielectric material that allows motor controller 150 to function as described herein. Dielectric material 246 reduces electrical interference between first circuit board 160 and second circuit board 162. In some embodiments, dielectric material 246 includes an opening aligned with at least one of openings 235 and 236 that allows snap-in post 234 to maintain a position of dielectric material 246 between first circuit board 160 and second circuit board 162.

In the exemplary embodiment, an insulating material 248 is positioned between dielectric material 246 and first circuit board 160 and an insulating material 250 is positioned between dielectric material 246 and second circuit board 162. Insulating materials 248 and 250 may include, but are not limited to, an insulating potting material. Insulating materials 248 and 250 reduce electrical interaction between bottom side 208 of first circuit board 160 and bottom side 208 of second circuit board 162. Insulating materials 248 and 250, in combination with dielectric material 246, facilitate reducing a distance 252 between first circuit board 160 and second circuit board 162. Reducing distance 252 facilitates reducing a height 254 of motor controller 150.

In the exemplary embodiment, end cap 16 includes heat sink 110. Heat sink 110 includes a heat sink extension 260 configured to be in contact with power module 172 when motor controller 150 is in position with respect to end cap 16. Heat sink 110 facilitates dissipation of heat generated by power module 172. In the exemplary embodiment, heat sink extension 260 includes at least one locator tab 262. Locator tab 262 is configured to interact with a portion of power module 172, for example, a slot 264, to facilitate proper alignment of motor controller 150 with respect to end cap 16. Integrating heat sink 110 into end cap 16, and configuring power module 172 to align with heat sink 110 when coupled to end cap 16, facilitates effective heat dissipation without soldering a heat sink to motor controller 150.

In at least one specific example, motor controller 150 is configured to power and control a two hundred and thirty volt (230V) motor, and therefore power module 172 is rated to handle at least 230V. In the at least one specific example, power module 172 is a dual in-line package power module. Motor controller 150 may have a diameter 266 that is less than approximately six inches. For example, diameter 266 may be between five inches and six inches or, more specifically, between 5.2 inches and 5.8 inches, or even more specifically, between 5.4 and 5.6 inches.

Since electrical components 170 and 220 extend from top side 206 of first circuit board 160 and top side 206 of second circuit board 162, and first circuit board 160 and second circuit board 162 are coupled together such that bottom side 208 of first circuit board 160 is adjacent bottom side 208 of second circuit board 162, in at least one specific example, distance 252 between first circuit board 160 and second circuit board 162 is less than eleven millimeters (11 mm). For example, distance 252 may be between two millimeters (2 mm) and ten millimeters (10 mm) or, more specifically, between four millimeters (4 mm) and eight millimeters (8 mm). In at least one specific example, positioning insulating materials 248 and 250, and dielectric material 246, between first circuit board 160 and second circuit board 162 facilitates coupling first circuit board 160 and second circuit board 162 such that distance 252 is approximately six millimeters (6 mm). The method and apparatus described herein facilitate assembling a motor controller having a reduced height 254, by reducing distance 252 between first circuit board 160 and second circuit board 162.

Figure 6:
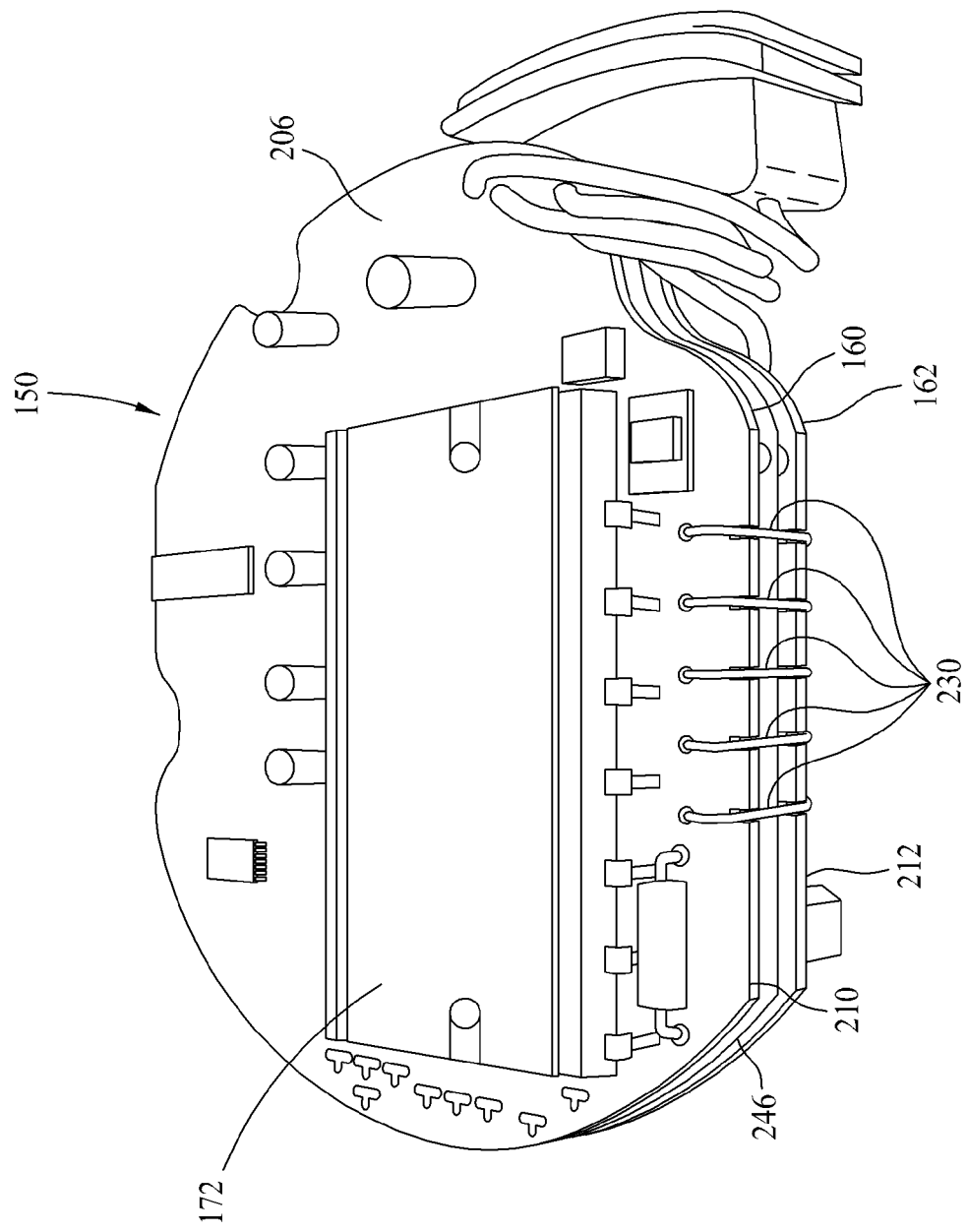
Figure 7:
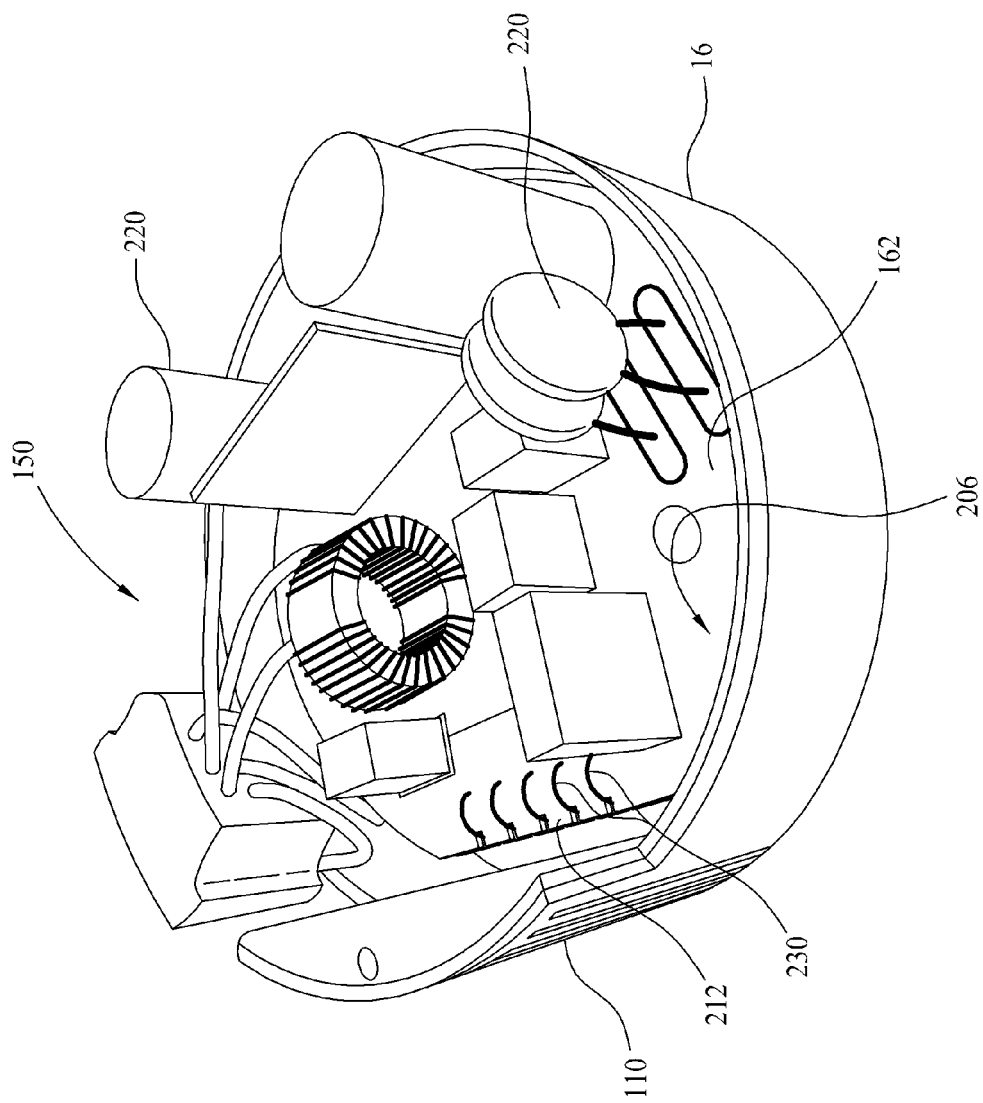

FIG. 6 is a first perspective view of motor controller 150. FIG. 7 is a second perspective view of motor controller 150. More specifically, FIG. 6 shows top side 206 of first circuit board 160 and second circuit board 162 positioned adjacent first circuit board 160. FIG. 7 shows top side 206 of second circuit board 162, and also shows motor controller 150 positioned at least partially within end cap 16.

Figure 8:
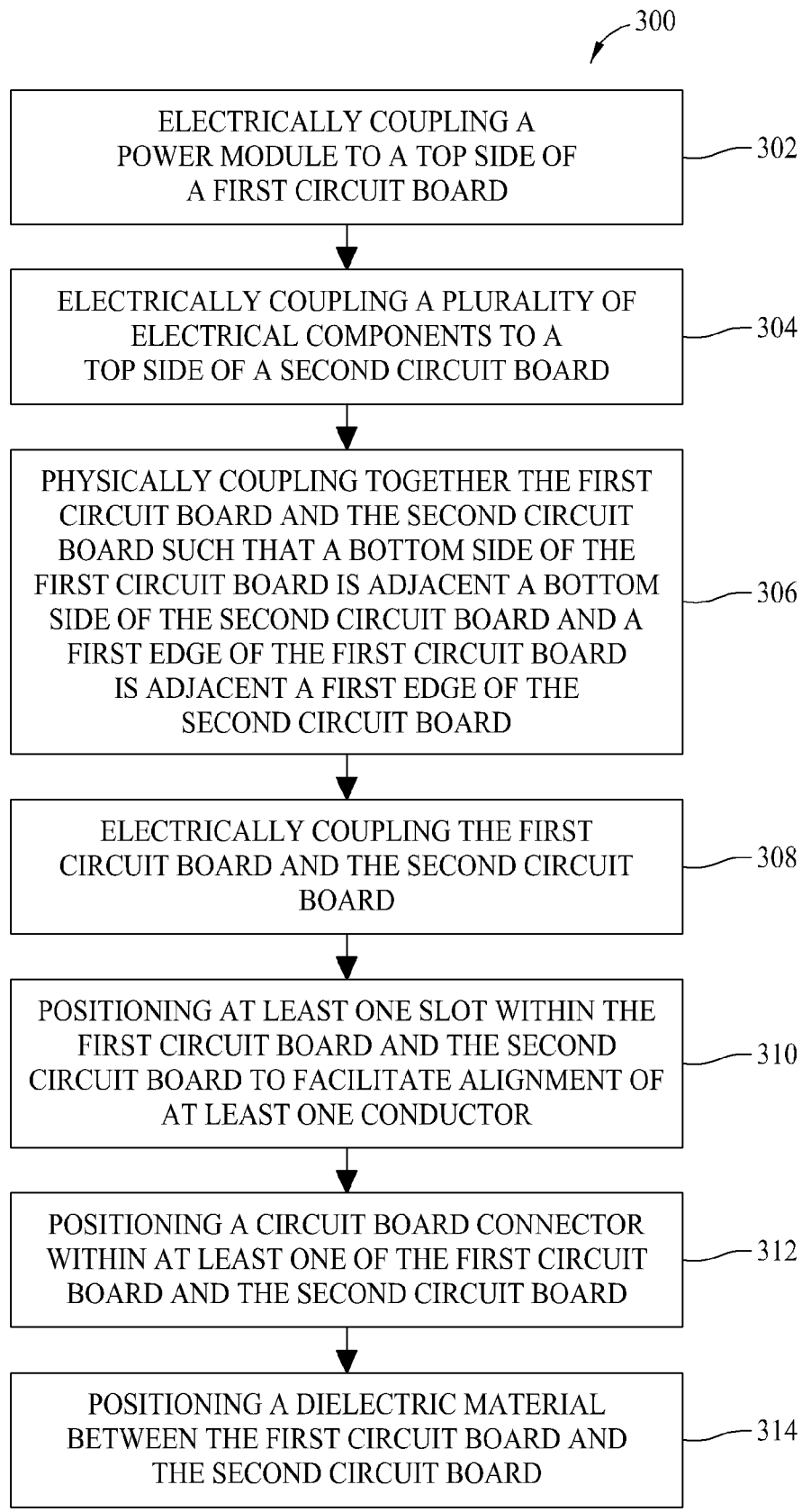

FIG. 8 is a flowchart 300 of an exemplary method for assembling a motor controller, for example, motor controller 150 (shown in FIGS. 4-7). In the exemplary embodiment, the method includes electrically coupling 302 a plurality of electrical components, for example, electrical components 170 (shown in FIG. 4), to a first circuit board, for example, first circuit board 160 (shown in FIG. 4). As described above, first plurality of electrical components 170 may include power module 172. The first plurality of electrical components 170 are coupled 302 to a top side of first circuit board 160. The method also includes electrically coupling 304 a second plurality of electrical components, for example, electrical components 220 (shown in FIG. 4) to a second circuit board, for example, second circuit board 162 (shown in FIG. 4). The second plurality of electrical components 220 are coupled 304 to a top side of second circuit board 162.

The method also includes coupling 306 first circuit board 160 and second circuit board 162 together, such that a bottom side of first circuit board 160 is adjacent a bottom side of second circuit board 162. Electrically coupling 302 and 304 components 170 and 220 to the top sides of first and second circuit boards 160 and 162, and coupling 306 together first circuit board 160 and second circuit board 162 such that the bottom sides of each circuit board 160 and 162 are adjacent, facilitates alignment of power module 172 with a heat sink, for example, heat sink 110 (shown in FIG. 5), while facilitating coupling all components of motor controller 150 to a single side of circuit boards 160 and 162.

In the exemplary embodiment, the method also includes electrically coupling 308 first circuit board 160 and second circuit board 162 together using at least one conductor, for example, jumper wires 230 (shown in FIG. 4). The method may also include positioning 310 at least one slot, for example, slots 232 (shown in FIG. 4), within first circuit board 160 and second circuit board 162, wherein slots 232 facilitate proper alignment of jumper wires 230. Furthermore, the method may also include positioning 312 a circuit board connector, for example, snap-in post 234 and associated openings 235 and 236 (shown in FIG. 4), within at least one of first circuit board 160 and second circuit board 162. The circuit board connector is configured to couple together first circuit board 160 and second circuit board 162. The method may also include positioning 314 a dielectric material, for example, dielectric material 246 (shown in FIG. 5) between the bottom side of first circuit board 160 and the bottom side of second circuit board 162. Positioning 314 dielectric material 246 reduces electrical interference between first circuit board 160 and second circuit board 162.

The method and apparatus described herein facilitate manufacturing a compact motor controller 150, therefore minimizing an amount of space in motor assembly housing 18 (shown in FIG. 1) occupied by motor controller 150 and/or minimizing a height of motor assembly housing 18. Coupling components to only one side of two circuit boards 160 and 162 (shown in FIG. 4) and configuring circuit boards 160 and 162 to be coupled together to reduce height 254 of motor controller 150 facilitates manufacturing compact motor controller 150. The method also facilitates efficient manufacturing of motor controller 150 by eliminating hand soldering. Coupling components 170 and 220 to circuit boards 160 and 162, and coupling first circuit board 160 to second circuit board 162 as is described herein, facilitates reducing a size of motor controller 150.

The method and apparatus described herein facilitate efficient and economical assembly of a motor controller. Exemplary embodiments of the method and apparatus are described and/or illustrated herein in detail. The method and apparatus are not limited to the specific embodiments described herein, but rather, components of each apparatus, as well as steps of each method, may be utilized independently and separately from other components and steps described herein. Each component, and each method step, can also be used in combination with other components and/or method steps.

Although specific features of various embodiments of the invention may be shown in some drawings and not in others, this is for convenience only. In accordance with the principles of the invention, any feature of a drawing may be referenced and/or claimed in combination with any feature of any other drawing.

When introducing elements/components/etc. of the methods and apparatus described and/or illustrated herein, the articles "a," "an," "the," and "said" are intended to mean that there are one or more of the element(s)/component(s)/etc. The terms "comprising," "including," and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A motor controller comprising:
a first circuit board having a top side, a bottom side, and a first edge, the first circuit board comprising a power module extending from the top side of the first circuit board; and
a second circuit board having a top side, a bottom side, and a first edge, the second circuit board comprising a plurality of electrical components extending from the top side of the second circuit board, the second circuit board electrically coupled to the first circuit board by at least one conductor, the first circuit board physically coupled to the second circuit board such that the bottom side of the second circuit board is adjacent the bottom side of the first circuit board, wherein the first circuit board and the second circuit board include slots to facilitate maintaining a position of the at least one conductor, the slots positioned along the first edge of the first circuit board and the first edge of the second circuit board.

2. A motor controller according to claim 1, wherein the at least one conductor comprises a plurality of jumper wires positioned along the first edge of the second circuit board and the first edge of the first circuit board.

3. A motor controller according to claim 1, wherein the first circuit board and the second circuit board further comprise at least one circuit board connector configured to physically couple the first circuit board to the second circuit board.

4. A motor controller according to claim 1 further comprising a dielectric material positioned between the first circuit board and the second circuit board, the dielectric material configured to reduce interference between the first circuit board and the second circuit board.

5. A motor controller according to claim 1, wherein the first circuit board further comprises at least one heat sink connector configured to facilitate coupling the motor controller to an electric motor housing, wherein the electric motor housing comprises an integrated heat sink configured to align with the power module.

6. A motor controller according to claim 5, wherein the at least one heat sink connector comprises a first opening positioned within the first circuit board and a second opening positioned within the second circuit board, wherein the first opening and the second opening are configured to receive a connection device for coupling the motor controller to the electric motor housing.

7. A motor controller according to claim 1, wherein a distance between the first circuit board and the second circuit board is less than eleven millimeters.

8. An electric motor and motor controller assembly comprising:
a motor housing;
a stationary assembly positioned at least partially within said motor housing;
a rotatable assembly coupled to a shaft and configured to rotate with respect to said stationary assembly; and
a motor controller enclosed at least partially within said motor housing and configured to provide power to at least one of said stationary assembly and said rotatable assembly, said motor controller comprising:

a first circuit board having a top side, a bottom side, and a first edge, said first circuit board comprising a power module extending from the top side of said first circuit board; and a second circuit board having a top side, a bottom side, and a first edge, said second circuit board comprising a plurality of electrical components extending from the top side of said second circuit board, said second circuit board electrically coupled to said first circuit board by at least one conductor, said second circuit board physically coupled to said first circuit board such that the bottom side of said second circuit board is adjacent the bottom side of said first circuit board, wherein the first circuit board and the second circuit board include slots to facilitate maintaining a position of the at least one conductor, the slots positioned along the first edge of the first circuit board and the first edge of the second circuit board.

9. An assembly according to claim 8, wherein the at least one conductor comprises a plurality of jumper wires positioned along the first edge of said first circuit board and the first edge of said second circuit board.

10. An assembly according to claim 8, wherein said motor controller further comprises a dielectric material positioned between said first circuit board and said second circuit board.

11. An assembly according to claim 8 further comprising at least one heat sink connector configured to couple said motor controller to said motor housing, wherein a heat sink is integrated within said motor housing.

* * * * *